(12) United States Patent
Passe et al.

(10) Patent No.: US 11,619,971 B1
(45) Date of Patent: Apr. 4, 2023

(54) PERSONAL COMPUTER WIRELESS DEVICE DOCKING STATION

(71) Applicant: Securus Technologies, Inc., Carrollton, TX (US)

(72) Inventors: Scott Passe, Forney, TX (US); James LeBoeuf, Lake Elsinore, CA (US); Kendrick Sims, Mansfield, TX (US); Jamie Nicole Wade, Denton, TX (US); Luke Keiser, Frisco, TX (US)

(73) Assignee: Securus Technologies, Inc., Carrollton, TX (US)

(*) Notice: Subject to any disclaimer, the term of this patent is extended or adjusted under 35 U.S.C. 154(b) by 0 days.

(21) Appl. No.: 16/778,293

(22) Filed: Jan. 31, 2020

Related U.S. Application Data (63) Continuation-in-part of application No. 16/572,388, filed on Sep. 16, 2019, which is a continuation of application No. 15/912,980, filed on Mar. 6, 2018, now Pat. No. 10,416,715.

(51) Int. Cl.

| | |
|---|---|
| *G06F 1/16* | (2006.01) |
| *H04M 1/72409* | (2021.01) |
| *H04M 1/72433* | (2021.01) |
| *H04M 1/72439* | (2021.01) |

(52) U.S. Cl.
CPC ...... *G06F 1/1632* (2013.01); *H04M 1/72409* (2021.01); *H04M 1/72433* (2021.01); *H04M 1/72439* (2021.01); *H04M 2250/02* (2013.01); *H04M 2250/04* (2013.01); *H04M 2250/06* (2013.01)

(58) Field of Classification Search
CPC ............ G06F 1/1632; H04M 1/72409; H04M 1/72439; H04M 1/72433
See application file for complete search history.

(56) References Cited

U.S. PATENT DOCUMENTS

| | | | |
|---|---|---|---|
| 4,685,129 | A | 8/1987 | Gavrilovich |
| 4,916,441 | A | 4/1990 | Gombrich |
| 5,931,929 | A | 8/1999 | Tran et al. |
| 6,005,873 | A | 12/1999 | Amit |
| 6,011,579 | A | 1/2000 | Newlin |
| 6,523,079 | B2 | 2/2003 | Kikinis et al. |
| 7,457,250 | B2 | 11/2008 | Austermann, III et al. |
| 8,125,318 | B2 | 2/2012 | Heimbrock et al. |

(Continued)

*Primary Examiner* — Nabil H Syed
(74) *Attorney, Agent, or Firm* — Fogarty LLP (57) ABSTRACT

A communication system comprises a processing system configured to support data, voice and video communications. A docking station is coupled to the processing system and is configured to provide power and data connections to a personal computer wireless device. The personal computer wireless device is configured to provide power, data, and analog connections. The docking station includes a Voice over Internet Protocol (VoIP) phone, such as a Session Initiation Protocol (SIP), phone. The docking station may include a keypad configured to initiate, or otherwise enable, VoIP phone call functions. The docking station is coupled to the processing system over at least one pair of low-voltage wires having an electrical current sufficient to power the personal computer wireless device. The pair(s) of low-voltage wires may provide sufficient electrical current to charge a battery in the personal computer wireless device.

20 Claims, 5 Drawing Sheets

(56) References Cited

U.S. PATENT DOCUMENTS

| | | |
|---|---|---|
| 8,849,902 B2 | 9/2014 | Fiatal |
| 9,472,071 B1 | 10/2016 | Passe et al. |
| 10,050,668 B1 | 8/2018 | Keiser et al. |
| 2003/0112968 A1 | 6/2003 | Styron |
| 2006/0291493 A1 | 12/2006 | Schley-May et al. |
| 2008/0005433 A1 | 1/2008 | Diab et al. |
| 2009/0209288 A1* | 8/2009 | Rofougaran ...... H04M 1/72409 455/556.1 |
| 2009/0213242 A1* | 8/2009 | Rofougaran ...... H04M 1/72409 348/222.1 |
| 2009/0264124 A1* | 10/2009 | Rofougaran ......... H04W 88/12 455/434 |
| 2010/0061545 A1 | 3/2010 | Kitchin et al. |
| 2010/0138582 A1* | 6/2010 | Bird ........................ H04L 65/60 710/303 |
| 2010/0237984 A1 | 9/2010 | Zenaty |
| 2010/0246232 A1 | 9/2010 | Chen et al. |
| 2011/0053643 A1* | 3/2011 | Shmunis ................. H04M 1/04 455/556.1 |
| 2011/0080899 A1* | 4/2011 | Delker .............. H04M 3/42263 370/338 |
| 2012/0092377 A1 | 4/2012 | Stein |
| 2012/0155445 A1* | 6/2012 | Javaregowda ...... H04L 65/1083 370/338 |
| 2013/0054863 A1 | 2/2013 | Imes et al. |
| 2013/0109253 A1 | 5/2013 | Gammon et al. |
| 2013/0179949 A1 | 7/2013 | Shapiro |
| 2013/0194377 A1 | 8/2013 | Humphries |
| 2013/0263227 A1 | 10/2013 | Gongaware et al. |
| 2013/0297844 A1* | 11/2013 | Rosenberg ............ H04L 9/3213 710/303 |
| 2014/0218466 A1 | 8/2014 | Bloms et al. |
| 2014/0267547 A1 | 9/2014 | Torgersrud et al. |
| 2014/0334610 A1 | 11/2014 | Hangsleben |
| 2016/0182291 A1* | 6/2016 | Verma ...................... H04B 7/26 709/221 |
| 2016/0309008 A1 | 10/2016 | Hangsleben |
| 2016/0315836 A1 | 10/2016 | Hill |
| 2018/0069964 A1* | 3/2018 | Koreis ................. H04W 88/04 |
| 2018/0129247 A1* | 5/2018 | Inane ................... H02J 7/0027 |
| 2019/0014062 A1* | 1/2019 | Hodge ................... H04L 69/24 |
| 2019/0297302 A1* | 9/2019 | Humphries ............ H04L 12/14 |

\* cited by examiner

PERSONAL COMPUTER WIRELESS DEVICE DOCKING STATION

CROSS-REFERENCE TO RELATED APPLICATION

This is a continuation-in-part of, and claims benefit of, U.S. patent application Ser. No. 16/572,388, entitled Personal Computer Wireless Device Docking Station on Low Power Network, filed Sep. 16, 2019, which is a continuation of, and claims benefit of, U.S. patent application Ser. No. 15/912,980, also entitled Personal Computer Wireless Device Docking Station on Low Power Network, filed Mar. 6, 2018 and issued as U.S. Pat. No. 10,416,715, on Sep. 17, 2019, each of which are hereby incorporated herein by reference.

BACKGROUND

Portable computing devices, including tablets, laptop computers, and personal digital assistants, allow users to access many of the functions of a personal computer (PC) while facilitating freedom of movement. Portable computing devices can offer a very high level of mobility and flexibility to the user. Portable computers are generally lightweight and compact, but these devices can also be subject to certain limitations, such as smaller keyboards and displays, reduced battery storage, lack of a keyboard, mouse, or printer ability, restricted network connections, or limited memory/data storage.

Traditionally, jails and prisons have allowed inmates to contact friends and family via letters and telephone calls. More recently, jails and prisons have begun to allow inmates to use portable electronic devices, such as tablets, to facilitate contact with friends and family and for entertainment and education. It is not desirable to provide inmates with chargers or other electronics that could be used with the tablets since these devices might be used as weapons or vandalized. However, there is still a need to charge the tablets and potentially a desire to expand the capabilities of portable devices.

SUMMARY

The present invention is directed to providing a docking station or charging station for portable devices. In an example embodiment, a communication system comprises a processing system configured to support data, voice and video communications, and a docking station coupled to the processing system and configured to provide power and data connections to a personal computer wireless device, wherein the personal computer wireless device is configured to provide power, data, and analog connections, and wherein the docking station is coupled to the processing system over a pair of low-voltage wires having an electrical current sufficient to power the personal computer wireless device. The pair of low-voltage wires may provide sufficient electrical current to power the personal computer wireless device, to charge a battery in the personal computer wireless device, and/or to charge a battery in the docking station.

In accordance with some embodiments of the present systems and methods, the docking station includes a Voice Over Internet Protocol (VoIP) phone, such as a Session Initiation Protocol (SIP) phone. In accordance with such embodiments, the docking station may include a keypad configured to initiate, or otherwise enable, VoIP phone call functions. In accordance with such embodiments, the docking station may be configured to disable such VoIP phone call functions of the docking station when a personal computer wireless device is held in the docking station. In accordance with further embodiments, a VoIP communication in progress on a personal computer wireless device may be swapped to the docking station VoIP phone upon the personal computer wireless device being placed in or on the docking station, by handoff of VoIP signaling from the personal computer wireless device to the docking station.

In accordance with some embodiments of the present systems and methods, the docking station is coupled to the communication processing communication system over a plurality of pairs of low-voltage wires, such as an Ethernet cable. At least some of such a plurality of pairs of low-voltage wires may provide a data connection, such as for VoIP phone call functions, and the like, and at least some of the plurality of pairs of low-voltage wires have an electrical current sufficient to power the personal computer wireless device, and charge its battery. Such power may be provided over these pairs of Ethernet cable wires in accordance with a Power over Ethernet (PoE) protocol.

Additionally, in accordance with such, or other, embodiments, another docking station, a Publicly Switched Telephone Network (PSTN) phone or an independent VoIP phone may be coupled to a communication network, via the docking station, and (a) further docking station(s), PSTN phone(s) or independent VoIP phone(s) may be coupled to the communication network, via this other docking station, the PSTN phone or the independent VoIP phone.

The personal computer wireless device may be configured to execute a plurality of applications. Additionally, or alternatively, the docking station may be configured to execute one or more applications. At least one of the applications may be disabled or enabled only when the personal computer wireless device is connected to the docking station.

The personal computer wireless device may comprise a camera, which may tilt. The camera may be enabled only when the personal computer wireless device is connected to the docking station. In other embodiments, the personal computer wireless device does not have a camera, but the personal computer wireless device may access a camera on the docking station when connected to the docking station.

A power, data, or analog connection between the docking station and the personal computer wireless device may be a wired or wireless connection.

When the personal computer wireless device is connected to the docking station, the personal computer wireless device may be enabled to connect to a peripheral device. The peripheral device may be selected from the group consisting of a printer, a scanner, a local memory store, a cloud-based memory store, a keyboard (e.g., physical or virtual), a mouse, a trackball, a handset, a media capture device, RFID capture device and a biometric device. The docking station may further comprise a handset, speaker, and/or microphone that is activated only when a personal computer wireless device is connected to the docking station or that is deactivated when a personal computer wireless device is not connected to the docking station.

In another embodiment, a method for accessing a communication system comprises connecting a personal computer wireless device to a docking station, wherein the docking station is connected to a processing system that is configured to support data, voice, and video communications; and providing power to the personal computer wireless device from the docking station using electrical current received over a pair of low-voltage wires. The pair of low-voltage wires may provide sufficient electrical current to charge a battery in the personal computer wireless device.

The method may further comprise disabling at least one application on the personal computer wireless device in response to connecting the personal computer wireless device to the docking station. The method may further comprise enabling at least one application on the personal computer wireless device in response to connecting the personal computer wireless device to the docking station. The method may further comprise enabling at least one application on the docking station in response to connecting the personal computer wireless device to the docking station.

The method may further comprise enabling a camera on the personal computer wireless device in response to connecting the personal computer wireless device to the docking station. The method may further comprise allowing the personal computer wireless device to access a camera on the docking station in response to connecting the personal computer wireless device to the docking station.

The method may further comprise allowing the personal computer wireless device to access one or more peripheral device in response to connecting the personal computer wireless device to the docking station. The peripheral device may be selected from the group consisting of a printer, a scanner, a keyboard (e.g., physical or virtual), a mouse, a trackball, a handset, a local memory store, a cloud-based memory store, a media capture device, a biometric sensor, and an RFID transceiver.

In a further embodiment, a charging system comprises a docking station coupled to a telephone network over a single pair of wires, wherein the docking station is further adapted to be selectively coupled to a portable device, and wherein the single pair of wires provides an electrical current sufficient to charge a battery in the portable device, power the portable device, and/or charge a battery in the docking station. The single pair of wires may be capable of carrying telephone audio signals. The telephone network may provide at least 40-60 mA current or 5 volts to the docking station via the single pair of wires.

In some embodiments, the communication processing system may monitor handset speaker and/or microphone loop current sensors to determine if the handset speaker and/or the microphone are functional.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It will be understood that the drawings and detailed description are not intended to limit the specification to the particular form disclosed, but, on the contrary, the intention is to cover all modifications, equivalents and alternatives falling within the spirit and scope of the claims.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Figure 1:
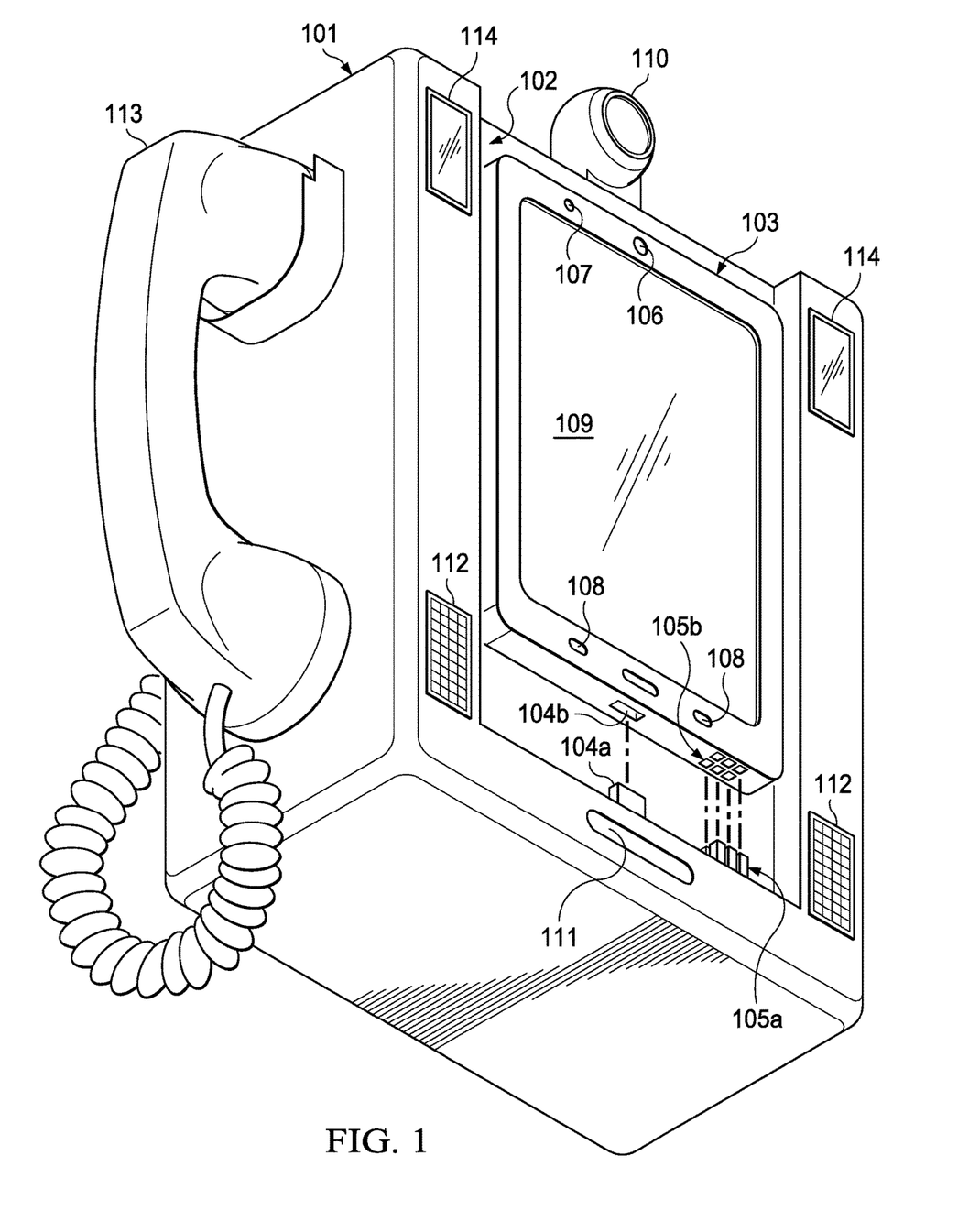
FIG. 1 is a diagram of a docking station according to an example embodiment.

FIG. 1 is a diagram of a docking station 101 according to an example embodiment. Docking station 101 has an area 102 adapted to hold a personal computer wireless device 103. Area 102 may be a shelf, ledge, lip, slot, frame, detent, bracket, or other structure that is configured to hold personal computer wireless device 103 in or on docking station 101. Although area 102 is shown as a recessed area in FIG. 1, it will be understood that in other embodiments personal computer wireless device 103 may be positioned above docking station 101 (e.g., the bottom of personal computer wireless device 103 sitting on the top of docking station 101) or may be held in a position external to docking station 101 (e.g., on a ledge or bracket extending from the side of docking station 101). Personal computer wireless device 103 may be held in position by gravity (e.g., personal computer wireless device 103 sitting on a shelf or surface of docking station 101) and/or by a more secure method (e.g., using VELCRO®, magnets, straps, rails, or other fasteners or structures). Additionally, adapter sleeves or rails may be used to ensure alignment of the personal computer wireless device 103 relative to docking station 101, which would allow docking station 101 to be used with different size personal computer wireless devices.

Docking station 101 provides a direct or indirect electronic connection to personal computer wireless device 103. In some embodiments, docking station 101 has a connector 104a adapted to engage a connector 104b on personal computer wireless device 103. Connectors 104a, b may be, for example, USB (type-A, -B, or -C, mini, or micro), Lightening, RS232, RJ11, RJ45, or any other standardized or proprietary connectors. Alternatively, or additionally, docking station 101 and personal computer wireless device 103 may be linked using pogo pins or probes 105a that engage contacts 105b. Probes 105a may have a fixed length or may be spring-loaded. Any number of probes 105a and contacts 105b may be used and may be arranged in any appropriate configuration or format (e.g., all in one line, distributed in a matrix or array, etc.). The male and female side of the connectors 104a, b or probes 105a, b may be located on either docking station 101 or personal computer wireless device 103. Connectors 104a, b and/or probes 105a, b may be used to pass data (in digital or analog form), audio, and/or power between docking station 101 and personal computer wireless device 103. If both connectors 104a, b and probes 105a, b are present, they may pass data, audio, and/or power between docking station 101 and personal computer wireless device 103 at the same time (i.e., simultaneously). Alternatively, one of these links might be dedicated to one type of connection (e.g., power) and the other link used for other connections (e.g., data and/or audio).

In other embodiments, docking station 101 and personal computer wireless device 103 may be communicatively coupled via a radio frequency (RF) interface, such as connections based on Wi-Fi®, Li-Fi, Bluetooth, ZigBee, WiMAX, Near-field communication (NFC), or other communication protocols or standards. The RF connection may be used to pass data between docking station 101 and personal computer wireless device 103 at the same time (i.e., simultaneously) as connectors 104a, b and/or probes 105a, b. Alternatively, the RF connection may be the only data link between the devices. Personal computer wireless device 103 may also communicate with other devices, such as a wireless access point or router (not shown) via an RF connection.

In some embodiments, docking station 101 may provide wireless power to personal computer wireless device 103 using time-varying electric, magnetic, or electromagnetic fields. Wireless power transmission provides power to personal computer wireless device 103 without requiring a direct connection (e.g., connectors 104a, b or probes 105a, b). Wireless power transmission may be non-radiative or radiative. In near field or non-radiative techniques, power is transferred over short distances by magnetic fields using inductive coupling between coils of wire, or by electric fields using capacitive coupling between metal electrodes. In far-field or radiative techniques, power is transferred by beams of electromagnetic radiation, such as microwaves or laser beams. Docking station 101 and personal computer wireless device 103 may be configured with the appropriate circuitry (e.g., coils, armatures, or antennas) to support either non-radiative or radiative wireless power transmission.

Personal computer wireless device 103 may optionally have a camera 106, microphone, 107, and speakers 108 that allow a user to interact with the personal computer wireless device 103. Personal computer wireless device 103 has a display screen 109 that may provide an interface to application programs, which may be selected by touching application icons and/or using a keyboard. For example, personal computer wireless device 103 may have a physical keyboard attached and/or may have a touch-sensitive screen that can display a virtual keyboard and/or one or more application icons. Display 109 may be any suitable electronic display such as a liquid crystal display (LCD), thin-film-transistor liquid-crystal display (TFT LCD), light-emitting diode (LED), touchscreen display (e.g., resistive, capacitive, etc.), or the like. Docking station 101 may also provide a tiltable camera 110, microphone 111, and speakers 112. Upward and downward tilting camera 110 may, in accordance with embodiments of the present systems and methods, be associated with the Voice Over Internet Protocol (VoIP) phone such as a Session Initiation Protocol (SIP) phone, discussed below, or with the personal computer wireless device when the personal computer wireless device is held in the docking station. Docking station camera 110 may tilt at an angle appropriate to conform with the Americans with Disabilities Act (ADA), or the like. By way of example, such an angle of tilt of camera 110 may be fifteen degrees, plus-or-minus (i.e. upward or downward from horizontal). Speakers 108 and 112 may be permanently affixed devices on personal computer wireless device 103 and docking station 101, or speakers 108 and 112 may be attached (e.g., by wire or wirelessly) as headphones or earbuds. Docking station 101 also has a handset 113 that provides a microphone and speaker interface. Docking station may also include lights 114 that can be used to illuminate the user who is in front of camera 110. When personal computer wireless device 103 is coupled to docking station 101, the camera 110, microphone 111, speakers 112, and/or handset 113 on the docking station may be used instead of, or in place of, camera 106, microphone, 107, and/or speakers 108. Cameras 106, 110 may be any suitable imaging device, such as a video camera or webcam equipped with charge-coupled devices (CCDs), complementary metal—oxide—semiconductor (CMOS) active pixel sensors, etc. It will be understood that the size, positioning, orientation, and type of devices shown as connectors 104a,b, probes 105a,b, camera 110, microphone 111, speakers 112, and handset 113 in FIG. 1 are merely illustrative and that any appropriate replacement components may be used to provide the same functionality and operational capability as these examples. In another embodiment, for example, camera 110 may be embedded within docking station 101 in a form that has a lower profile and that is less exposed to damage or vandalism. Additionally, docking station 101 may have multiple cameras 110 to support facial recognition technology for biometrics or other applications.

Personal computer wireless device 103 may have limited input/output capabilities, such as having speakers 108 and display 109 only (i.e., no microphone or camera). This configuration allows a user to watch movies, listen to music, read e-books, and read/write messages on personal computer wireless device 103, but would not allow the user to participate in telephone calls or interactive video conferences. However, when personal computer wireless device 103 is coupled to docking station 101, then camera 110, microphone 111, speakers 112, and handset 113 are available to the user so that communications applications on personal computer wireless device 103 can be accessed to make telephone calls or join video conferences. Speakers 112 may be used as a microphone in other embodiments, which would eliminate the need for a separate microphone 111. Additional embodiments may include multiple microphones 111 to provide far field voice monitoring capability. This would enable docking station 101 to clearly capture voice inputs in high ambient noise environments and/or to provide enhanced voice biometrics capability. In other embodiments (not shown), docking station 101 may also include a keyboard and/or may provide access to other network devices, such as a printer, scanner, storage drive, or the like.

Although the examples described herein refer to a personal computer wireless device 103, it will be understood that docking station 101 may provide data and power to a personal computer wireless device, such as any portable electronic device or computer-based system. Examples of personal computer wireless devices that may be used with docking station 101 include a tablet computer, laptop computer, smartphone, personal digital assistant, media player, e-book reader, or the like. In one embodiment, personal computer wireless device 103 may be specially adapted and/or approved for use by residents of a controlled-environment facility. For example, in a correctional institution (e.g., a jail or prison), personal computer wireless device 103 may be "stripped-down," particularly from the standpoint of the operating system capabilities, the application programs (apps) that are provided or allowed on personal computer wireless device 103, and/or the connectivity afforded personal computer wireless device 103. In a correctional facility environment, docking station 101 may have a hardened case and may be mounted on a wall or in a kiosk in location available to multiple users having personal computer wireless devices. Likewise, in some such embodiments, personal computer wireless device 103 may be a tablet computer, smartphone, personal digital assistant, media player, e-book reader, or the like of a non-resident visitor to a controlled-environment facility, such as a correctional facility, or a non-resident visitor to a remote visitation center associated with such a controlled-environment/correctional facility. Therein, the non-resident visitor may make use of docking station 101 located in a visitor area, the visitor center, etc., for charging their personal computer wireless device 103, and/or for carrying out a video visitation with a controlled-environment/correctional facility resident/inmate using the non-resident visitor's docked personal computer wireless device, in accordance with embodiments of the present systems and methods. Additionally, or alternatively, in such a visitor center or controlled-environment facility visitor area, a personal computer wireless device may be provided to a non-resident visitor to use in a video visitation with a resident/inmate.

Personal computer wireless device 103 may be adapted to connect only to a network provided by the controlled-environment facility and/or only in certain locations within the controlled-environment facility. Such connectivity may be limited by controlling the availability of wireless/RF access to certain areas through the placement of wireless access points or adjusting antenna directionality of such wireless access points. Personal computer wireless device 103 may have a limited number of pre-installed applications on the device, such as communications, telephone calling, video conferencing, or video visitation applications. Installation of further applications on the device may be forbidden (e.g., prevented by the device's operating system) and/or restricted (e.g., requiring permission from an administrator).

A user may be prompted to provide a personal identification number (PIN), biometrics (e.g., facial recognition, fingerprints, finger geometry, iris recognition, vein recognition, retina scanning, voice recognition, or DNA matching) or other identifying information to access personal computer wireless device 103. Either docking station 101 and/or personal computer wireless device 103 may have a biometric sensor (not shown) to authenticate user biometric information.

Figure 1A:
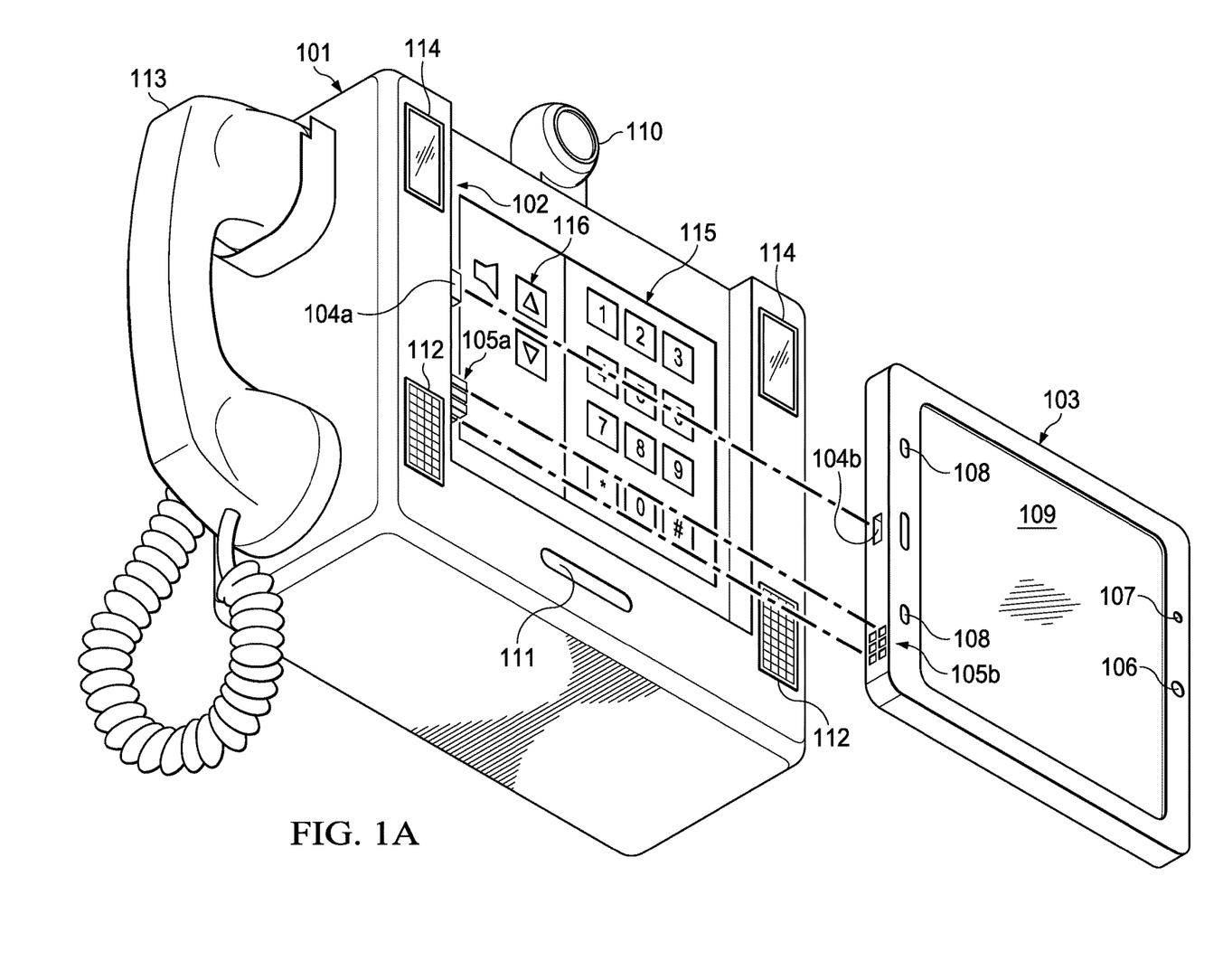
FIG. 1A is another diagram of a docking station according to an example embodiment.

FIG. 1A is another diagram of a docking station according to an example embodiment. As shown in FIG. 1A, docking station 101, and/or personal computer wireless device 103, may alternatively be configured such that docking station 101 holds or supports personal computer wireless device 103 in a landscape orientation. In accordance with some embodiments of the present systems and methods a communication system may include a communication processing system configured to support data, voice and video communications and a docking station coupled to the communication processing system the docking station, wherein the docking station includes a VoIP phone, such as a SIP phone. That is, in accordance with such embodiments of the present systems and methods, docking station 101 may incorporate VoIP phone functionality. To wit, docking station 101 may also have keypad 115. Keypad 115 may include, beyond zero to nine digit keys, separate loudness control 116, which may, such as in accordance with ADA requirements, or the like, offer there or move volume settings for VoIP phone calls carried out using handset 113 or microphone 111 and speaker(s) 112. In accordance with such embodiments, keypad 115 is used to initiate, or otherwise enable, VoIP phone call functions. Also, in accordance with such embodiments, docking station 101 may be configured to disable such VoIP phone call functions of the docking station when personal computer wireless device 103 is held in the docking station. Conversely, in accordance with further embodiments, a VoIP communication in progress on personal computer wireless device 103 may be swapped to the docking station VoIP phone upon the personal computer wireless device being placed in or on the docking station, by handoff of VoIP signaling, such as SIP signaling, from the personal computer wireless device to the docking station.

Additionally, in accordance with such, or other, embodiments, another docking station, a Publicly Switched Telephone Network (PSTN) phone or an independent VoIP phone may be coupled to a communication network, via docking station 101, and (a) further docking station(s), PSTN phone(s) or independent VoIP phone(s) may be coupled to the communication network, via this other docking station, the PSTN phone or the independent VoIP phone.

Figure 2:
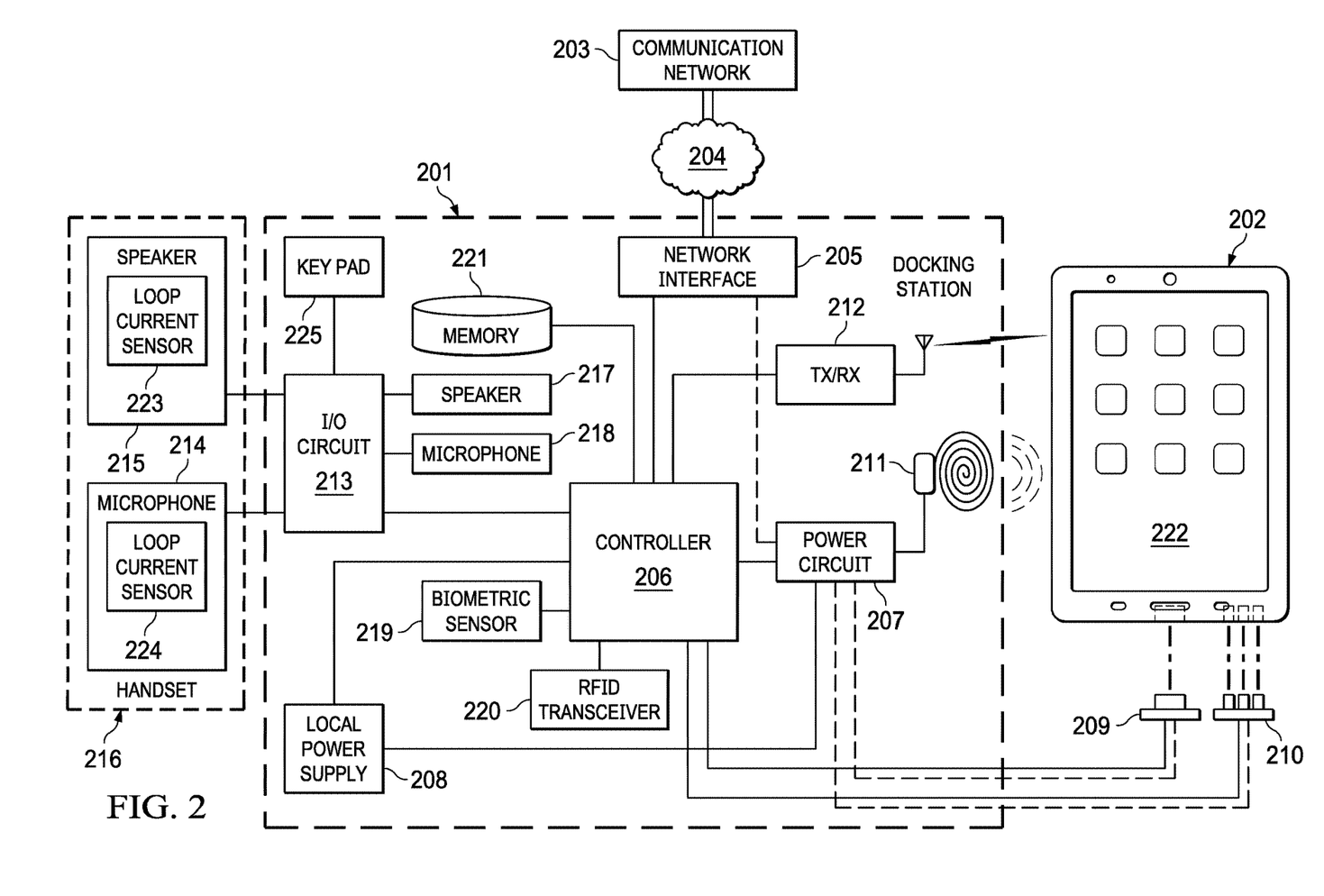
FIG. 2 is a block diagram illustrating components of a docking station according to an example embodiment.

FIG. 2 is a block diagram illustrating components of a docking station 201 according to an example embodiment. Docking station 201 may be used to provide an interface between personal computer wireless device 202 and a remote communication network 203 via network 204. Docking station 201 may function to communicate information, such as data packets and/or speech signals, between personal computer wireless device 202 and communication network 203. For example, in accordance with some embodiments of the present systems and methods docking station 201 may act as a VoIP phone (i.e., include VoIP phone functionality). For example, a SIP VoIP phone is an IP phone that implements client and server functions of a SIP user agent and provides call functions, such as dial, answer, etc. Additionally, or alternatively, docking station 201 may transfer power from communication network 203 to personal computer wireless device 202.

Docking station 201 has a network interface 205 adapted to connect to network 204. In one embodiment, network 204 is a network of single pairs of low-voltage wires, such as telephone wires (e.g., a twisted pair of copper wires), alarm system wires, intercom wires, etc. Each pair of low-voltage wires may terminate in the form of a telephone jack, connector, or the like for connection to network interface 205. In other embodiments, network 204 may be an Ethernet network that is connected to network interface 205 by a Cat 5 cable or other communication or data network that is connected to network interface 205 by a coaxial or other cable. Further, in accordance with some embodiments of the present systems and methods the docking station may be coupled to communication network 203 over a plurality of pairs of low-voltage wires, such as an Ethernet cable. At least some of such a plurality of pairs of low-voltage wires may provide a data connection, such as for VoIP phone call functions, and/or the like, and at least some of the plurality of pairs of low-voltage wires have an electrical current sufficient to power the personal computer wireless device, and charge its battery. Such power may be provided over these pairs of Ethernet cable wires in accordance with a Power over Ethernet (PoE) protocol. In some other, or further, embodiments, network 204 may be, or at least include, a wireless network, such as a wireless local area network (WLAN). In such embodiments, network interface 205 may provide a wireless interface for connecting to WLAN 204, rather than, or in addition to, the above discussed wire pair(s) interface.

In some wired embodiments, communication network 203 may include an extended signaling and electrical powering system that provides electrical power and/or communications to docking station 201 over network 204. An example extended signaling and electrical powering system 203, 204, 205 is described in U.S. Pat. No. 8,594,314, titled "Extended Signaling System and Method," the disclosure of which is hereby incorporated by reference herein in its entirety. An extended signaling and electrical powering system is described in more detail below in connection with FIG. 3. The extended signaling and electrical powering system in network 203 may enable a source of electrical current to deliver an amount of current over the same existing wiring that is higher than ordinarily provided to enable telephone use over a single pair of low-voltage wires. The extended signaling and electrical powering system in network 203 may also enable the exchange of telephony and non-telephony signals (e.g., data) between communication system network 203 and docking station 201. As such, although a typical 48 VDC powered telephone line is only sufficient to provide about 25 mA of DC current to a local telephone or device, an extended signaling and electrical powering system may allow the same low-voltage level to deliver a current in excess of 25 mA using the same wiring while providing additional power, signaling, and data communication capabilities. As such, communications network 203 may be configured to deliver at least 40-60 mA or more current to docking station 201 (instead of the typical 25 mA current). Furthermore, communications network 203 may enable the additional current to be converted to a lower voltage but higher current, which is then made available to docking station 201 over the same single pair of wires in network 204. For example, in some implementations, communication network 203 may be capable of providing 100 mA or more current at 5V to docking station 201 over thousands of feet of standard telephone wire in addition to providing signaling channels to enable data communication services.

Controller 206 manages and controls the operation of docking station 201 in one embodiment. Controller 206 may be a microprocessor or application-specific integrated circuit (ASIC) that allows for intelligent operation of docking station 201 by executing software or firmware instructions. The VoIP phone may be implemented herein as a hardware device by implementation of softphone software, firmware, or the like by docking station controller 206, or the like. In one embodiment, controller 206 functions as a modem to provide a Digital Subscriber Line (DSL) data connection between docking station 201 and communication network 203. In other embodiments, network 205 and controller 206 may be hardwired circuitry (e.g., filters, splitters, rectifiers, matching circuits) adapted to couple lines from network 203 to various components in docking station 201.

Docking station 201 includes a power circuit 207 that provides charging and/or operating power to docking station 201 and personal computer wireless device 202. Power circuit 207 may receive power from communication network 203 directly or under control of controller 206. In this embodiment, docking station 201 would be powered by relatively low power that is available across a single pair of wires in network 204. In some embodiments, a local power supply 208 may provide power to docking station 201 and power circuit 207 in addition to or in place of power from network 203. Power supply 208 may be a battery, an AC adapter, or any other power source that is charged, for example, by current from network 203. Power circuit 207 may provide power directly to personal computer wireless device 202 through connector 209 and/or probes 210. Additionally, or alternatively, power circuit provides power via wireless power transmitter 211 (e.g., a coil, armature, or antenna) to a corresponding wireless power receiver (not shown) on personal computer wireless device 202.

Connector 209 and/or probes 210 may provide a data connection between docking station 201 and personal computer wireless device 202. The data may comprise digital packets of varying complexity or may be analog voice and/or video signals. Additionally, or alternatively, a wireless transceiver 212 may provide a radio frequency (RF) interface (e.g., based on Wi-Fi, Bluetooth, ZigBee, WiMAX, Near-field communication (NFC), or other communication protocols or standards) and may exchange data and/or audio wirelessly between docking station 201 and personal computer wireless device 202.

Docking station 201 further includes an input/output circuit 213 that provides an interface to microphone 214 and speaker 215. Input/output circuit 213 receives audio/speech signals from microphone 214 and provides audio/speech signals to speaker 215. Microphone 214 and speaker 215 may be discrete components in docking station 201 and/or may be embodied in a handset 216. When personal computer wireless device 202 is coupled to docking station 201 via connector 209, probes 210, or wireless interface 212, handset 216 (or microphone 214 and speaker 215, individually) provide an additional or extended audio input/output for personal computer wireless device 202. In some embodiments, in place of a separate handset 216, docking station 201 may function as a speakerphone having a built-in speaker 217 and microphone 218.

In one embodiment, circuitry for enabling the functionality of handset 216, microphones 214, 218, and speaker 215, 217 is included in personal computer wireless device 202 so that these components are only operable when personal computer wireless device 202 is coupled to docking station 201. For example, signals for handset 216, microphones 214, 218, and speaker 215, 217 may be routed through connector 209 and/or probes 210 so that the components do not work when nothing is attached to the connector or probes. In other embodiments, when no personal computer wireless device 202 is connected to docking station 201, handset 216, microphones 214, 218, and speaker 215, 217 may be connected to communication network 203 for, normal telephone service or connected to an intercom system, or may be used for VoIP phone service. Handset 216 may have loop circuit sensor 223 communicatively coupled to the speaker, and/or loop circuit sensor 224 communicatively coupled to the microphone. These loop circuit sensors are, such as through I/O circuit 213, controller 206, interface network 205 and network 204, communicatively coupled to and communication network 203.

Docking station 201 may include a biometric sensor 219 that is coupled to controller 206. Biometric sensor 219 may be used, for example, to verify and/or authenticate a user's identity using facial recognition, fingerprints, finger geometry, iris recognition, vein recognition, retina scanning, voice recognition, or DNA matching.

Other technologies may also be used to verify and/or authenticate a user's identity. For example, docking station 201 may include a radio-frequency identification (RFID) transceiver, interrogator, or reader 220 that is configured to automatically identify and track RFID tags. These RFID tags may be attached to objects or people. For example, RFID tags may be attached to tamper-detecting bracelets that are worn by users and/or attached to personal computer wireless device 202. Docking station 201 can be configured to require detection of a known user RFID tag and/or a known personal computer wireless device 202 RFID tag before allowing personal computer wireless device 202 to be used with docking station 201.

In one embodiment, docking station 201 may be required to authenticate both the user (e.g., using biometrics, RFID, a PIN, etc.) and personal computer wireless device 202 (e.g., using RFID, an electronic or digital certificate, etc.) before allowing access to communication network 203 and/or docking station 201 functionality. RFID transceiver 220 may be used to track and locate personal computer wireless device 202 whether or not they are connected to docking station 201. RFID transceiver 220 may be used with proximity (e.g., ISO 14443 air-interface protocol standard) or vicinity (e.g., ISO 15693 air-interface protocol standard) tags. Proximity RFID tags employ close coupling and need to be in close proximity (e.g., a few centimeters) to the RFID transceiver 220. Vicinity RFID tags can be read at a distance (e.g., a meter or more). When personal computer wireless device 202 has an attached vicinity RFID tag, then personal computer wireless device 202 may be detected when passing docking station 201 even if the personal computer wireless device 202 is not actually connected to docking station 201. Vicinity RFID tags may be used to inventory personal computer wireless devices and/or for finding lost personal computer wireless devices. In an alternative embodiment, the RFID tag is located on docking station 201 and personal computer wireless device 202 has an RFID transceiver that is used to provide location, identification, and authentication functions.

The applications loaded on personal computer wireless device 202 may be available for use whether or not personal computer wireless device 202 is being used by itself or is coupled to docking station 201. For example, communication applications may be used by personal computer wireless device 202 alone or in conjunction with docking station 201 (e.g., handset 216 allows a user to have a more private conversation than using the communication application on personal computer wireless device 202 alone).

In other embodiments, applications on personal computer wireless device 202 may be specifically enabled or disabled when personal computer wireless device 202 is coupled to docking station 201. For example, certain applications on personal computer wireless device 202 may be disabled when the device is coupled to docking station 201. This may be required to isolate the application and/or communication network 203 from each other. This scenario might occur when certain content on communication network 203 (or on docking station 201) should not be accessed or downloaded by personal computer wireless device 202, or when content on personal computer wireless device 202 should not be uploaded to communication network 203 (or to docking station 201). In another example, an application may require more memory than is available on personal computer wireless device 202 or may require content or functionality that is only available on docking station 201 or communication network 203 (e.g., a database, authentication operation, additional graphics processing, lock icon overlay, etc.). When personal computer wireless device 202 is coupled to docking station 201, then this application on personal computer wireless device 202 may be accessed by the user, but would be unavailable (e.g., no icon on display, grayed-out icon, an error pop up message, etc.) when personal computer wireless device 202 is not connected to docking station 201.

There may be additional applications that are stored on or that execute only on docking station 201. Memory 221 may store application software and/or data for execution or use by controller 206. When personal computer wireless device 202 is coupled to docking station 201, then this application on docking station 201 may be accessed by the user. For example, an application stored in memory 221 may be too large to store on personal computer wireless device 202 or may require more processing capability/power than is available on personal computer wireless device 202 alone or might be available only to certain personal computer wireless devices or users. An icon for the application stored or executing on docking station 201 may be shown on display 222 only when personal computer wireless device 202 is coupled to docking station 201 since that is the only time that the application can be accessed by the personal computer wireless device user.

As noted, in accordance with embodiments of the present systems and methods, a communication system may include communication network 203 configured to support data, voice and video communications and docking stations 201 coupled to the communication network, such as via local network 204. In some embodiments, the docking stations not only selectively holds a personal computer wireless device and provides power and data connections to the personal computer wireless device, as discussed above, but also include VoIP phone functionality such as may be provided herein as a hardware device by implementation of softphone software, firmware, or the like by docking station controller 206, or the like. In such embodiments, docking station may include a keypad 225 configured to initiate, or otherwise enable, VoIP phone call functions.

In accordance with such embodiments, docking station 201 may be configured to disable such VoIP phone call functions of the docking station when personal computer wireless device 202 is held in the docking station. In accordance with further embodiments, a VoIP communication in progress on personal computer wireless device 202 may be swapped to the docking station VoIP phone upon the personal computer wireless device being placed in or on the docking station, by handoff of VoIP signaling from the personal computer wireless device being the docking station.

Additionally, in accordance with such, or other, embodiments, another docking station, a PSTN phone or an independent VoIP phone may be coupled to communication network 203, via docking station 201 (e.g. via network interface 205), and (a) further docking station(s), PSTN phone(s) or independent VoIP phone(s) may be coupled to the communication network, via this other docking station, the PSTN phone or the independent VoIP phone.

Figure 3:
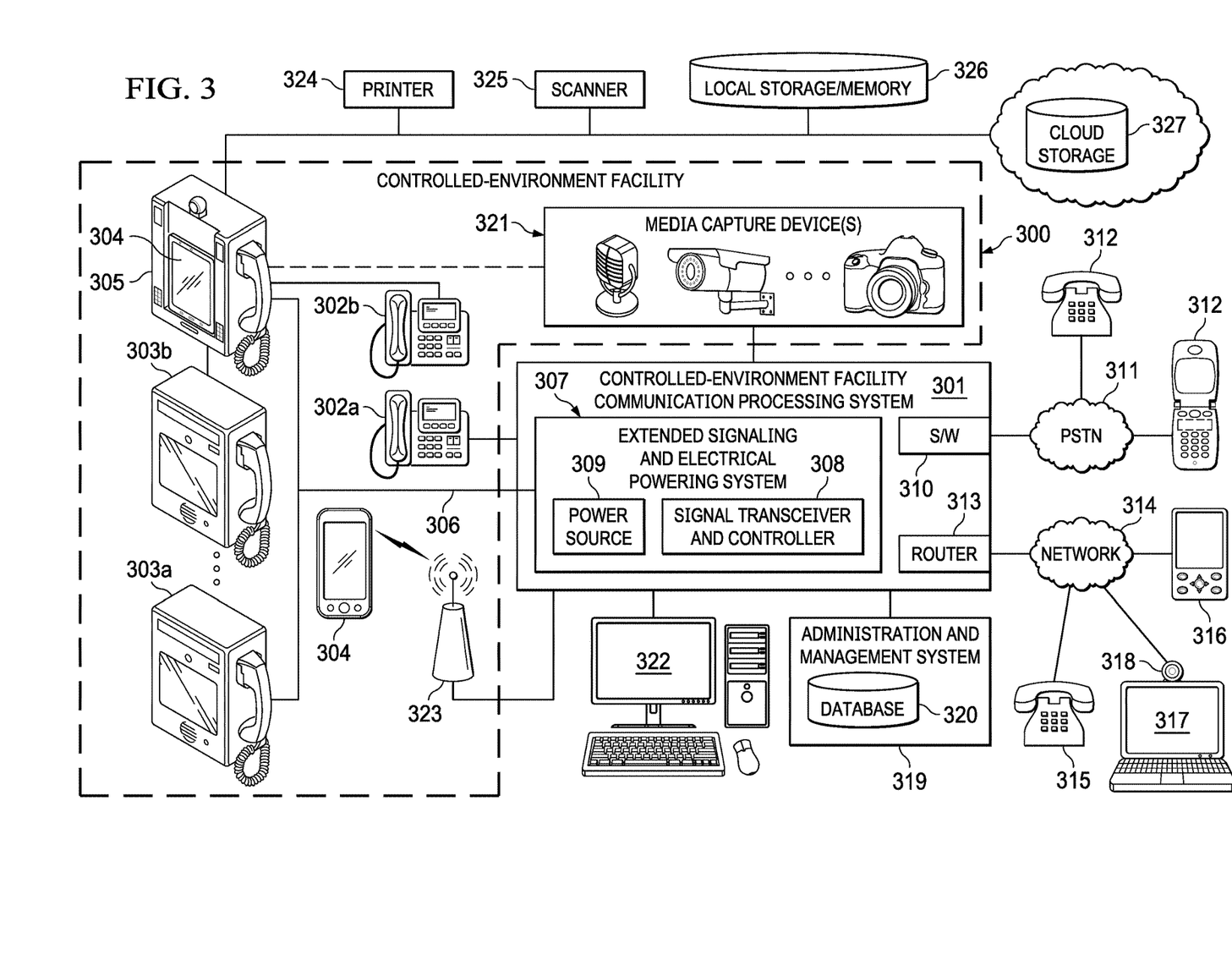
FIG. 3 is block diagram of an example of a system configured to provide communication services to a controlled-environment facility according to some embodiments.

FIG. 3 is block diagram of an example of a system configured to provide communication services to a controlled-environment facility according to some embodiments. As shown, communication processing system 301 may provide telephone services, videoconferencing, and/or other communication services to a controlled-environment facility 300. The communication processing system 301 may be implemented by one or more computer systems, an example of which is described below. In some cases, communication processing system 301 may be located in or remote from the controlled-environment facility 300. In some cases, communication processing system 301 may be centrally or remotely located with respect to one or more controlled-environment facilities and/or may provide communication services to multiple controlled-environment facilities. More generally, however, it should be noted that communication processing system 301 may assume a variety of forms, and may be configured to serve a variety of facilities and/or users, whether within or outside of a controlled-environment facility.

One or more resident communication devices are in the controlled-environment facility 300. In the illustrated example, the controlled-environment facility 300 includes one or more telephones 302 (302*a*, 302*b*, etc.) one or more smart terminals 303 (303*a*, 303*b*, etc.), and one or more personal computer wireless devices 304. In the illustrated example, the telephone 302 can be a digital telephone, such as implementing Voice over Internet Protocol (VoIP) communications, or another telephone. Smart terminal 303 may include a display (e.g., a touch-screen display or other electronic display), camera (e.g., a webcam), and handset. The smart terminal 303 can enable telephone calls via the traditional telephone handset. The smart terminal 303 may further include audio and videoconferencing capabilities, which may enable residents to participate in video visitation sessions with non-residents of the controlled-environment facility 300 via video call, secure online chat, etc. The smart terminal 303 can enable other forms of communication, such as emails, text messages, etc. A smart terminal 303 may be disposed in a visitation room, in a pod, kiosk, etc. Additionally, or alternatively, smart terminals 303 may be deployed in a visitation center or the like, remote from, or otherwise outside, controlled-environment facility 300. The personal computer wireless device 304 can be or include a tablet computer, laptop computer, smartphone, personal digital assistant, media player, e-book reader, and/or another portable or wireless device. The personal computer wireless device 304 can enable telephone calls, videoconferencing, emails, text messaging, and/or other communication formats.

Additionally, communication processing system 301 is connected to one or more docking stations 305 that are adapted for personal computer wireless devices 304. Docking station 305 may be directly or wirelessly coupled to personal computer wireless devices 304 to provide data and/or power connections. Users may connect their personal computer wireless devices 304 to a docking station 305 for charging and/or to access additional features or functionality that are not available on personal computer wireless devices 304 alone. Smart terminals 303 and docking stations 305 may be connected to communication processing system 301 by a single pair of low-voltage wires 306, such as telephone wires or a twisted pair of copper wires. Additionally, as illustrated, telephone 302 may, in accordance with embodiments of the present systems and methods, be coupled to controlled-environment facility communication processing system 301, via docking station 305, as discussed in greater detail herein.

Communication processing system 301 may include an extended signaling and electrical powering system 307 that provides electrical power and/or communications to devices 303, 305 over a network of single pairs of low-voltage electrical wires (e.g., telephone wires) 306. In various embodiments, extended signaling and electrical powering system 307 may operate as a "front end" configured to filter DC and/or AC current(s) on a transmission channel to separate these signals and to pass the DC current through a low-pass filter (LPF). Extended signaling and electrical powering system 307 may also provide a high frequency (out-of-band) signaling capability isolated from the DC and audio channels by a high-pass filter (HPF) via signal transceiver and controller (STC) module 308. Additionally, or alternatively, system 307 may provide an audio channel (e.g., in the speech frequency range) for telephony communications isolated from the DC path by a band-pass filter (BPF). As such, power source module 309 may be configured to deliver at least 40-60 mA or more to devices 303, 305 (instead of the typical 25 mA current). Alternatively, in accordance with some embodiments of the present systems and methods, the docking station may be coupled to communication network processing communication system 301 over a plurality of pairs of low-voltage wires, such as an Ethernet cable. At least some of such a plurality of pairs of low-voltage wires may provide a data connection, such as for VoIP phone call functions, or the like, and at least some of the plurality of pairs of low-voltage wires have an electrical current sufficient to power the personal computer wireless device, and charge its battery. Such power may be provided over these pairs of Ethernet cable wires in accordance with a PoE protocol, as noted.

Under the control of communication processing system 301, the resident communication devices (e.g., devices 302-305) of the controlled-environment facility 300 may be capable of communicatively connecting to an outside communication device, such as a device of a non-resident of the controlled-environment facility 300. The resident communication device may be communicatively coupled to an outside communication device through the communication processing system 301 to enable communications via, for example, calls, videoconferences, emails, text messaging, online chats, etc. As illustrated, the resident communication devices (e.g., devices 302-305) are communicatively coupled to the communication processing system 301. The communication processing system 301 includes a switch 310 that communicatively couples the communication processing system 301 to a PSTN 311. Remote telephone devices 312 are communicatively coupled to the PSTN 311. Hence, a resident communication device (e.g., device 302-305) may be communicatively coupled to the wireless mobile telephone and/or the landline telephone 312 via the communication processing system 301, the switch 310, and the PSTN 311.

The communication processing system 301 also includes a router 313 that communicatively couples the communication processing system 301 to a data network 314, such as a Wide Area Network (WAN), Local Area Network (LAN), the Internet, and/or a combination thereof. A digital telephone 315, a mobile computing device 316 (e.g., a mobile smart telephone, tablet, etc.), and a personal or laptop computer 317 (e.g., with a camera 318) are communicatively coupled to the data network 314. Hence, a resident communication device (e.g., device 302-305) may be communicatively coupled to the digital telephone 315, the mobile computing device 316, and/or the personal or laptop computer 317 via the communication processing system 301, the router 313, and the data network 314. A network connection between a resident communication device and an outside communication device through the data network 314 may be established and supported by an organization or commercial service that provides computer services and software for use in telecommunications and/or VoIP, such as SKYPE®. Alternatively, the controlled-environment facility 300 and/or the destination may use videoconferencing equipment compatible with ITU H.323, H.320, H.264, and/or V.80, or other suitable standards.

In addition to providing certain communication operations, communication processing system 301 may permit processing of communications to restrict aspects of communications and/or to obtain information from communications. As illustrated, an Administration and Management System (AMS) 319 maintains a database 320, and the AMS 319 is communicatively coupled to the communication processing system 301. The AMS 319 may be implemented by one or more computer systems. The AMS 319 may be co-located with and/or located remotely from the communication processing system 301. The AMS 319 may store account information corresponding to each resident of the controlled-environment facility 300 in the database 320. The communication processing system 301 may access account information of a resident from the AMS 319 (and the database 320) when processing a communication from that resident.

As an example, in the context of a correctional facility, the database 320 may include as account information for each resident the resident's Pre-Approved Contact (PAC) list and Resident Profile Data (RPD) information. The PAC list may include identities, devices, phone numbers, etc. of non-residents with whom the resident is permitted to communicate (e.g., a whitelist) or with whom they are prohibited from communicating (e.g., a blacklist). The RPD information may include, for example: balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and/or any other information that may be relevant or useful to correctional facility staff to house and maintain inmates.

When a resident attempts to initiate a communication, such as a telephone call, videoconference, etc., through a resident communication device (e.g., device 302-305), the resident may be prompted by the communication processing system 301 to provide identification information, such as a PIN, RFID, and/or biometrics (e.g., a voice sample, facial image, fingerprint, etc.). The identification information may be provided through the resident communication device and/or a media capture device 321 communicatively coupled to the communication processing system 301. The media capture device 321 may be part of an existing security surveillance infrastructure within the controlled-environment facility 300 or may be a device installed specifically for use with docking station 305. In other cases, a media capture device 321 may be installed in physical proximity to resident communication devices (e.g., in a visitation room or in the same pod, wing, etc.) but nonetheless distinct from those communication devices. For example, a PIN may be input through a keypad of the resident communication device (e.g., a punch pad, touch screen pad, virtual or physical keypad). Further, as an example, biometrics like a voice sample may be provided through a microphone of the resident communication device and/or a microphone of a media capture device 321. Similarly, as an example, a facial image may be provided by a camera of the smart terminal 303, personal computer wireless device 304, docking station 305, and/or by a camera (e.g., still capture and/or video camera) of the media capture device 321. With the identification information, the communication processing system 301 can compare the identification information against account information stored in the database 320 to identify which resident is initiating a communication and which corresponding account information to use to process the communication. For example, a PIN provided through the resident communication device can be compared to a PIN stored as account information, and/or a biometric sample can be compared to a corresponding biometric signature stored as account information.

In some examples, with the account information identified, the communication processing system 301 may attempt to ensure that the resident's communications (e.g., telephone calls, videoconferences, etc.) are performed only with non-residents whose identities, devices, phone numbers, etc. are listed in that resident's PAC list stored on the database 320. The communication processing system 301 may prohibit attempts to initiate communication with a non-resident whose identity, device, phone number, etc. is not included in the PAC list.

A monitoring system 322 may be used by authorized personnel to access on-going (i.e., real-time) and/or concluded communications for monitoring and/or investigative purposes. Alerts may be transmitted to the monitoring system 322 when significant volume level changes are detected by the communication processing system 301. Further, the monitoring system 322 may enable querying the database 320 via the communication processing system 301 for information contained in call detail records, recorded communications, etc. Access to communications and/or playback of communications may be enabled by the monitoring system 322.

Communication processing system 301 may, in addition to supporting data, voice and video communications, monitor the handset speaker and microphone loop current sensors (223 and 224) to monitor loop current in the handset speaker and/or microphone to determine if the handset speaker and/or the microphone are functional.

In accordance with some embodiments of the present systems and methods, a communication system may include communication processing system 301 configured to support data, voice and video communications and docking stations 305 coupled to the communication processing system, wherein the docking stations not only selectively hold personal computer wireless devices and provide power and data connections to the personal computer wireless devices, as discussed above, but also include a VoIP phone. In such embodiments, docking station may include a keypad configured to initiate, or otherwise enable, VoIP phone call functions.

In accordance with such embodiments, docking station 305 may be configured to disable such VoIP phone call functions of the docking station when a personal computer wireless device 304 is held in the docking station. In accordance with further embodiments a VoIP communication in progress on personal computer wireless device 304 may be swapped to the docking station VoIP phone upon the personal computer wireless device being placed in or on the docking station by handoff of VoIP signaling from the personal computer wireless device to the docking station.

Additionally, in accordance with such, or other, embodiments, another docking station (not shown), a PSTN or independent VoIP phone (302*b*), a smart terminals (303*b*), or the like, may be coupled to communication processing system 301, via docking station 305. (A) further docking station(s), (not shown) PSTN or independent VoIP phone(s) (not shown), smart terminal(s) (not shown), or the like may be coupled to the communication processing system, via this other docking station (not shown), other PSTN or independent VoIP phone (302*b*), other smart terminal (303*b*), or the like.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

Personal computer wireless device 304 may communicate with communication processing system 301 over an RF interface, such as by connecting to a Wi-Fi access point 323. Alternatively, personal computer wireless device 304 may communicate with communication processing system 301 over a wired connection using docking station 305. Depending upon the network traffic and the type of wireless and wired networks, data transfers to/from personal computer wireless device 304 may have more bandwidth and faster speeds when attached to docking station 305.

In a controlled-environment facility, docking station 305 may provide advantages such as controlling the operation of features and functions of personal computer wireless devices 304. For example, if personal computer wireless device 304 has a camera, the operation of that camera may normally be disabled for privacy and safety reasons so that pictures of the facility or other residents are not stored or transmitted outside the facility without facility authorization or approval. However, when personal computer wireless devices 304 is connected to docking station 305, then the camera may be activated since the field of view of the camera on a docked device is known, and the docking station can be positioned to ensure that field of view does not cover any sensitive areas. Additionally, docking station 305 may be placed in an area that is visible to and monitorable by the facility staff.

A further benefit of providing docking station in a controlled-environment facility is the ability to provide on-demand charging at any time using the docking station 305. This eliminates the need to have a staff member charge the personal computer wireless device 304 for a resident. In many personal computer wireless device deployments in controlled-environment facilities, the personal computer wireless devices are collected at the end of the day to be recharged overnight. Accordingly, if a personal computer wireless device's battery runs down during the day, a user would be unable to use the personal computer wireless device unless a docking station 305 was available.

When personal computer wireless device 304 is attached to docking station 305, the user may be able to access certain additional devices that are not available to personal computer wireless device 304 by another connection. For example, docking station 305 may be connected to printer 324, scanner 325, local storage/memory 326, and/or cloud storage 327. Docking station 305 may provide an authenticated and secure connection to personal computer wireless device 304, which allows applications on personal computer wireless device 304 to access printer 324, scanner 325, local storage/memory 326, and/or cloud storage 327. This would allow the user to print or scan documents, or to store data in a local memory in a cloud-based storage application (e.g., Dropbox, OneDrive, Google Drive, SecureCloud). Docking station 305 may also allow applications on personal computer wireless device 304 to access media capture devices 321.

It will be understood that the embodiment illustrated in FIG. 3 is merely one system that can adapted for use with a docking station. However, those of ordinary skill in the art will further understand that the docking station disclosed herein may be used in other configurations and systems. In view of the low power capabilities described herein, which allows both power and data to be passed across a single pair of low-voltage wires (e.g., telephone cables, a twisted pair of copper wires), the docking station can be deployed in any location having an existing two-wire communication network or where such a network can be installed. Examples include the public switched telephone network, single-user circuits on a telephone communication system, and telephone lines used to deliver landline telephone service and/or digital subscriber line (DSL) service to premises. A single pair of wires may be twisted or untwisted, and shielded or unshielded. However, untwisted and unshielded pairs of wires may be subject to interference and crosstalk. In an example embodiment, a docking station as disclosed herein may be installed in place of an existing pay telephone or phone booth in a public, private, or restricted location. Furthermore, it will be understood that the docking station disclosed herein may be used in any location or facility in other embodiments or deployments and that the docking station is not intended for use only in controlled-environment facilities.

Figure 4:
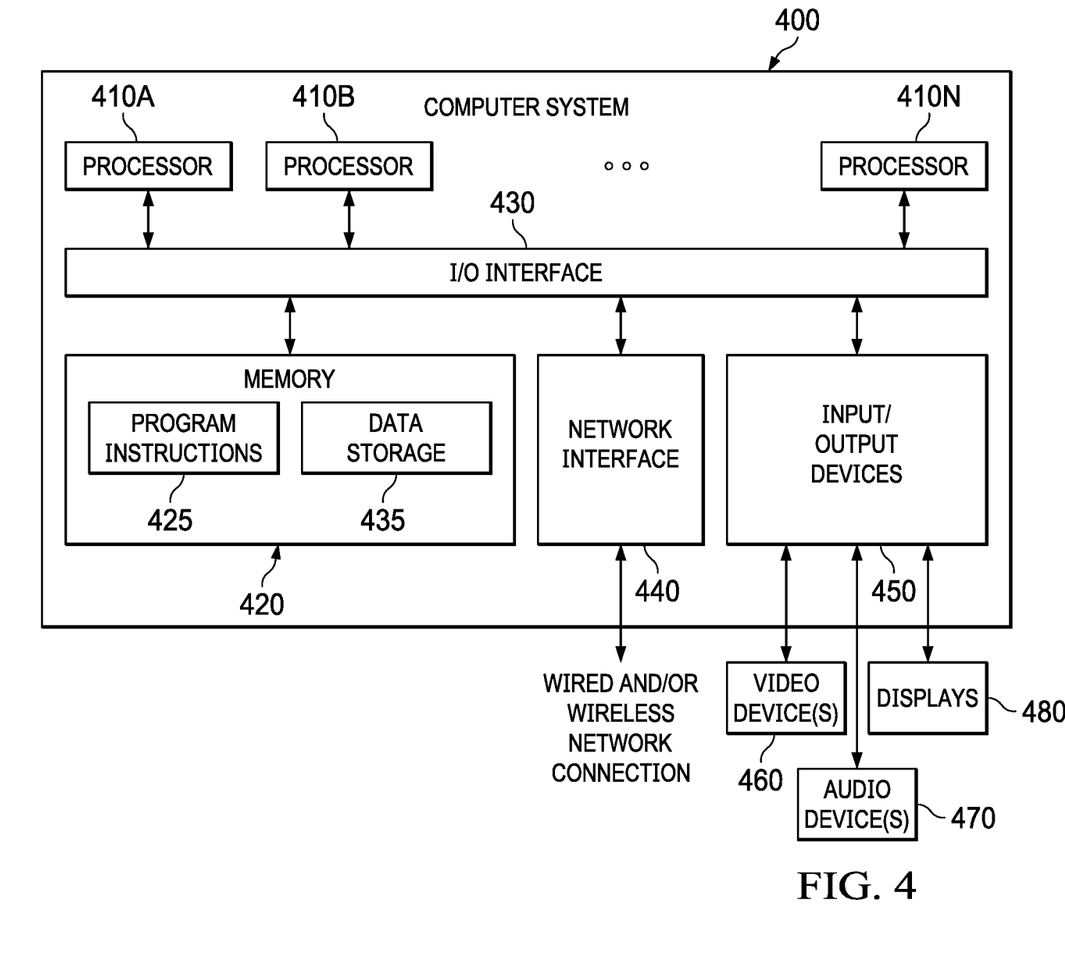
FIG. 4 is a block diagram of a computer system, device, station, or terminal configured to implement various techniques disclosed herein, according to some embodiments.

Embodiments of the present systems and methods for providing a docking station for personal computing devices, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a tablet computer, laptop computer, smartphone, personal digital assistant, media player, e-book reader, or the like. For example, in some cases, computer 400 may be used as, or as part of, one or more of docking stations 101, 201, 305, personal wireless computing devices 103, 202, 304, smart terminals 303, and communication processing system 301. In various embodiments two or more of these computer systems may be configured to communicate with each other in any suitable way, such as, for example, via a network (e.g., via networks 204, 311, 314).

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. In multi-processor systems, each of processors 410 may commonly, but not necessarily, implement the same architecture. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations, such as, for example, those described in connection with FIG. 1 through 3, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. A computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages. Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:

1. A communication system, comprising:
  a communication processing system configured to support data, voice and video communications;
  a docking station coupled to the communication processing system, the docking station comprising a voice over internet protocol phone and a keypad, and configured to:
    selectively hold a personal computer wireless device and provide power and data connections to the personal computer wireless device, the personal computer wireless device covering the keypad when the personal computer wireless device is held in the docking station; and
    disable docking station voice over internet protocol phone call functions when the personal computer wireless device is held in the docking station.

2. The communication system of claim 1, wherein the keypad is configured to initiate/enable voice over internet protocol phone call functions when the personal computer wireless device is not held in the docking station.

3. The communication system of claim 1, wherein the docking station is coupled to the communication processing system over a pair of low-voltage wires providing a data connection for voice over internet protocol phone call functions and an electrical current selectively powering the personal computer wireless device when held in the docking station.

4. The communication system of claim 3, wherein the pair of low-voltage wires provide sufficient electrical current to charge a battery in the personal computer wireless device.

5. The communication system of claim 1, wherein the docking station is coupled to the communication processing communication system over a plurality of pairs of low-voltage wires at least some of which provide a data connection for voice over internet protocol phone call functions and at least some of which have an electrical current sufficient to power the personal computer wireless device.

6. The communication system of claim 5, wherein pairs of low-voltage wires having an electrical current sufficient to power the personal computer wireless device provide sufficient electrical current to charge a battery in the personal computer wireless device.

7. The communication system of claim 5, wherein the pairs of wires are pairs of Ethernet cable wires and the electrical current is provided in accordance with a power over Ethernet protocol.

8. The communication system of claim 1, wherein the docking station is configured to disable one or more computer wireless device application programs when the personal computer wireless device is held in the docking station.

9. The communication system of claim 1, wherein the personal computer wireless device is configured to execute a voice, video and/or text application when the personal computer wireless device is connected to the docking station.

10. The communication system of claim 1, further comprising another docking station, a public switched telephone network phone or an independent voice over internet protocol phone coupled to the communication processing system, via the docking station.

11. The communication system of claim 10, further comprising a further docking station, public switched telephone network phone or independent voice over internet protocol phone coupled to the communication processing system, via the other docking station, the public switched telephone network phone or the independent voice over internet protocol phone.

12. The communication system of claim 1, wherein the docking station further comprises a tilting camera associated with the voice over internet protocol phone or associated with the personal computer wireless device when the personal computer wireless device is held in the docking station.

13. A method for accessing a communication system, comprising:
    connecting a docking station to a communication processing system that is configured to support voice and video voice over internet protocol communications;
    selectively connecting a personal computer wireless device to, and selectively supporting the personal computer wireless device by the docking station, the docking station comprising a voice over internet protocol phone and a keypad, the personal computer wireless device covering the keypad when the personal computer wireless device is held in the docking station;
    providing data communication to the docking station voice over internet protocol phone and the personal computer wireless device over at least one pair of low-voltage wires;
    providing power to the docking station, and to the personal computer wireless device when held in the docking station, using electrical current received over the same or different at least one pair of low-voltage wires.

14. The method of claim 13, further comprising swapping a voice over internet protocol communication in progress on the personal computer wireless device to the docking station voice over internet protocol phone upon the personal computer wireless device being placed in the docking station.

15. The method of claim 13, further comprising disabling docking station voice over internet protocol phone call functions when the personal computer wireless device is held in the docking station.

16. The method of claim 13, further comprising coupling a further docking station, public switched telephone network phone or independent voice over internet protocol phone to the communication processing system, via the public switched telephone network phone or the independent voice over internet protocol phone.

17. The method of claim 13, further comprising providing, by the same or different at least one pair of low-voltage wires, sufficient electrical current to charge a battery in the personal computer wireless device.

18. The method of claim 13, wherein the at least one pair of low-voltage wires comprise pairs of Ethernet cable wires and the electrical current is provided in accordance with a power over Ethernet protocol.

19. The method of claim 13, further comprising :
    disabling one or more computer wireless device application programs when the personal computer wireless device is held in the docking station; and/or
    executing a voice, video and/or text application on the personal computer wireless device when the personal computer wireless device is connected to the docking station.

20. A docking station comprising:
    a voice over internet protocol phone;
    a keypad; and
    a docking area configured to selectively hold a personal computer wireless device, the personal computer wireless device covering the keypad when the personal computer wireless device is held in the docking area;
    the docking station configured to:
        be coupled to a communication processing system;
        selectively provide power and data connections to the personal computer wireless device when the personal computer wireless device is held in the docking area; and
        disable docking station voice over internet protocol phone call functions when the personal computer wireless device is held in the docking area.

* * * * *